United States Patent [19]
Kohl

[11] 3,790,884
[45] Feb. 5, 1974

[54] SEVERE THUNDERSTORM DETECTOR

[76] Inventor: Douglas A. Kohl, 417 Sixth Ave. N.E., Osseo, Minn. 55369

[22] Filed: Aug. 2, 1972

[21] Appl. No.: 277,473

[52] U.S. Cl. .................................. 324/72, 73/170 R
[51] Int. Cl. .......................................... G01w 1/00
[58] Field of Search .......... 324/72; 73/170; 340/201

[56] References Cited
UNITED STATES PATENTS
| | | | |
|---|---|---|---|
| 2,953,020 | 9/1960 | Hunt | 324/72 X |
| 3,245,078 | 4/1966 | Kohl | 73/170 R |
| 3,715,660 | 2/1973 | Ruhnke | 73/170 R |

OTHER PUBLICATIONS
Stanford et al., J. Atmos. Sci. Vol. 28, April 1971, pp. 436–448.

*Primary Examiner*—Alfred E. Smith
*Attorney, Agent, or Firm*—Stuart R. Peterson

[57] ABSTRACT

Electrical circuitry provides for the detection of severe thunderstorms in a local area. Severe thunderstorms are those accompanied by damaging winds, hail or tornados. An antenna, which may be directional or omnidirectional, is used to detect the electromagnetic and electrostatic fields at a location. The electrostatic field at the location is applied to a circuit which provides a first signal indicating the presence of a severe thunderstorm in the local area when the rate of occurrence of maxima and minima variation of the electrostatic field exceeds a predetermined level. The electromagnetic field is applied to a second circuit which serves to provide a second signal when the variations in the electromagnetic field indicate the presence in the local area of any thunderstorm. Concurrence of the first and second signals is required to activate an alarm.

16 Claims, 3 Drawing Figures

Patented Feb. 5, 1974

SEVERE THUNDERSTORM DETECTOR

BACKGROUND OF THE INVENTION

1. Field of the invention

The invention presented herein relates to weather detection apparatus and in particular to electronic circuitry for detection of severe thunderstorms in a local area.

2. Discussion of the Prior Art

It is known that any thunderstorm causes changes in the electrostatic field at a location. The rate of change or first time derivative of the electrostatic field has been used in weather instrumentation to detect lightning. Since lightning is generally present in a thunderstorm, detection of the first time derivative of the electrostatic field provides a means for detecting a thunderstorm. Such detection, however, does not provide reliable information as to the severity of the thunderstorm.

Instrumentation has also been used to detect the electromagnetic field generated by lightning and numerous sparks which occur during a thunderstorm. The electromagnetic radiation produced by thunderstorms is generally referred to as sferics. Circuitry of this type provides another way for detecting the presence of a thunderstorm, but like the electrostatic field detection mentioned, does not provide reliable information to indicate the severity of a thunderstorm.

SUMMARY OF THE INVENTION

The invention presented herein provides for the detection of severe thunderstorms in a local area. The term severe thunderstorm is intended to mean thunderstorms having a high probability of producing damaging winds, large hail and/or tornados. An antenna and associated electronics are used for determining the second time derivative (maxima and minima occurrences) of the electrostatic field present at a location and provide a first signal indicative of the occurrence of maxima and minima in the varying electrostatic field at a predetermined rate, such rate being present when a severe thunderstorm is in the local area.

Since snow storms and dust storms can also produce a rate of occurrence of maxima and minima in the varying electrostatic field at a location incorrectly indicative of a severe thunderstorm, it is desirable that means be provided to classify the type of storm to avoid false indications of severe thunderstorms. Circuitry is therefore included for providing a second signal indicative of the presence of a thunderstorm in the local area. In one embodiment, the electromagnetic field at the location is sensed to determine the presence of a thunderstorm within a local area. More specifically the same antenna used to sense the electrostatic field is used to sense the electromagnetic field. The electromagnetic signals at a narrow frequency band above 400kHz are selected and demodulated to provide pulses which are applied to a standard count rate circuit. When rate of occurrence of the pulses exceed a predetermined level, a second signal indicative of the presence of a thunderstorm in the local area is produced. When the first signal indicative of a severe thunderstorm and the second signal indicative of a thunderstorm concur, an alarm circuit is actuated to warn of the presence of a severe thunderstorm within the local area. Concurrence of the signals is determined by an AND circuit, the output of which controls the alarm circuit.

BRIEF DESCRIPTION OF THE DRAWING

The invention will be understood and its various advantages will become apparent from the description to follow given in conjunction with the accompanying drawing wherein.

DESCRIPTION

Figure 1:
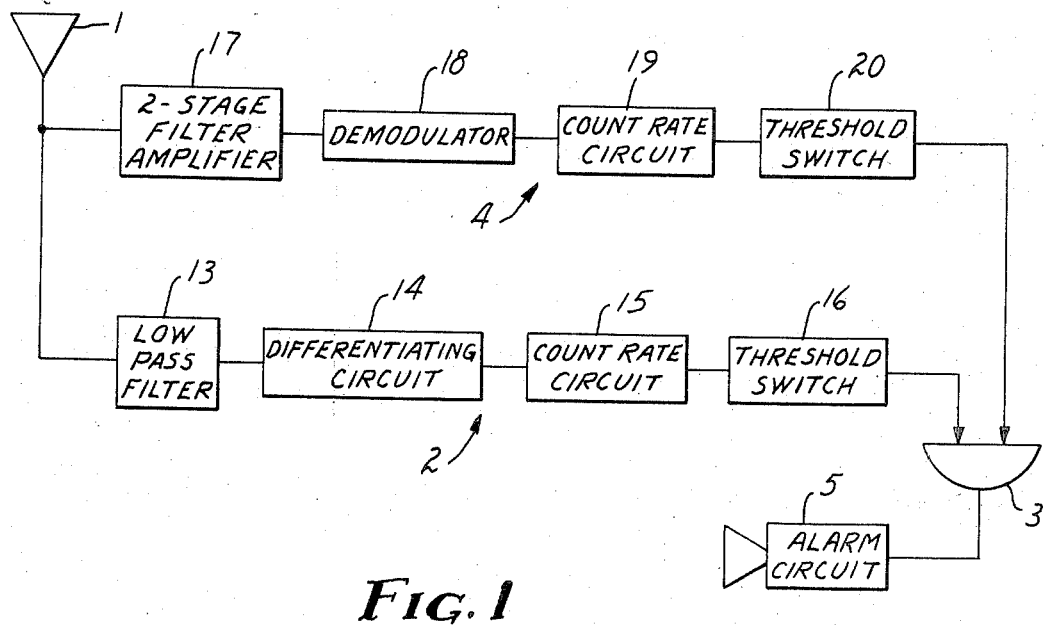
FIG. 1 is a block diagram of circuitry embodying the invention.

FIG. 1 of the drawing is a block diagram of the circuitry for a severe thunderstorm detector embodying the invention. An omnidirectional antenna 1 can be used to sense the electrostatic field at a location and to sense electromagnetic radiation produced by thunderstorm within a few miles radius of the antenna. A circuit capable of detecting the presence of a severe thunderstorm within a radius of approximately 10 miles will provide sufficient warning. If desired, a directional antenna can also be used for the antenna 1. The circuitry indicated generally at 2 connects with the antenna 1 and processes the electrostatic field sensed by antenna 1. It has been found that a correlation exists between the rate of occurrence of maxima and minima in the varying electrostatic field at a location and the presence of a severe thunderstorm in the local area. Considering a plot of the electrostatic field versus time, the maxima and minima are those points on the plot which have a slope of zero. The circuitry 2 serves to determine when the electrostatic field has the rate of occurrence of maxima and minima indicative of the presence of a severe thunderstorm in the local area. When a severe thunderstorm is detected by the circuitry 2, a signal from circuitry 2 is applied to the AND circuit 3 to indicate such detection.

The electrostatic field can be advantageously used to detect severe thunderstorms in a local area since the electric field strength for a net charge in a cloud varies inversely with range between the center of charge of the thunderstorm and the antenna. The variation approaches an inverse cube of range relationship so any detection of a severe thunderstorm on the basis of the electrostatic field decreases rapidly with distance.

Since snow storms and dust storms as well as thunderstorms can cause the circuitry 2 to provide a thunderstorm indicating signal as an input to AND circuit 3, an additional signal is needed which will serve to classify the weather condition as a thunderstorm. The circuitry indicated generally at 4 has this function. The circuitry 4 is connected to the antenna 1 and provides a second input signal to AND circuit 3 indicating when a thunderstorm is present in the local area. Concurrence at AND circuit 3 of a signal from circuit 4 indicative of the presence of a thunderstorm and a signal from circuit 2 indicative of a severe thunderstorm causes the AND circuit 3 to produce an output signal for actuating the alarm circuit 5 to provide the user with an audible signal warning him of the presence of a severe thunderstorm in the local area.

Figure 2:
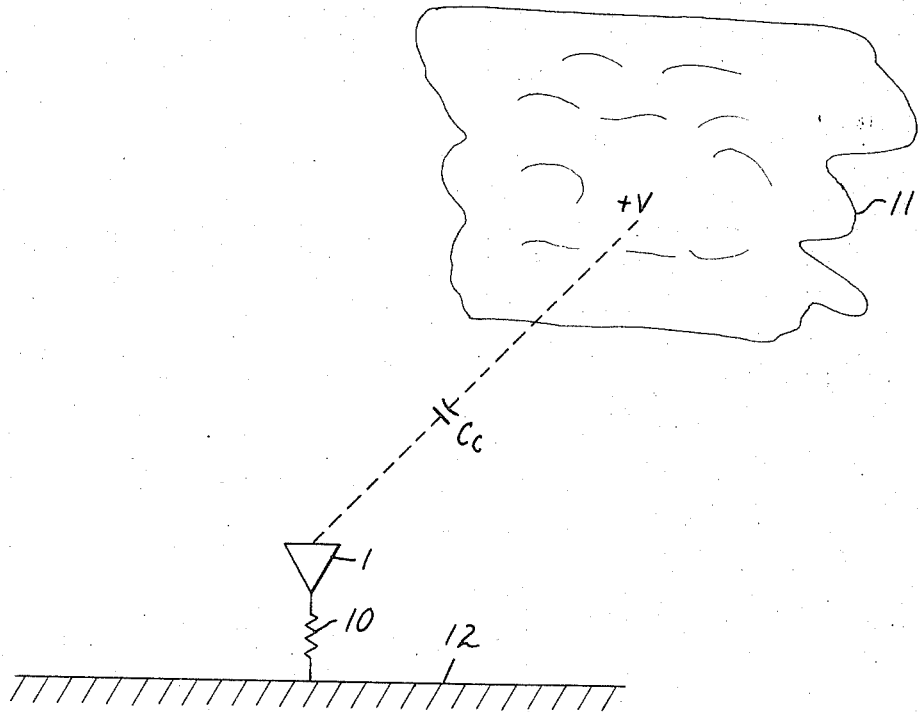
FIG. 2 is a diagram depicting the electric analog of the physical configuration for sensing of the electric field at a location.

The circuitry 2 includes a resistor 10 which connects the antenna 1 to ground. The resistor 10 and the capacitance existing between the antenna 1 and the charge center in the thunderstorm serve to provide a voltage for the remainder of circuitry 2 that is proportional to the first time derivative of the electric field. FIG. 2 shows a thunderstorm 11 with capacitance $C_c$ representing the capacitive coupling present between the antenna 1 and the charge center +V in the thunderstorm 11. The antenna 1 is connected to earth 12 via the resistor 10. The thunderstorm 11 is considered to be above the earth 12 at a much greater height than antenna 1 is posiitioned above the earth 12. The coupling capacitance $C_c$ and the resistor 10 ($R_{10}$) comprise an electrical RC circuit which is well known as a differentiator. The voltage appearing across the resistor 10 is represented by the equation $e(t)=R_{10} C_c dV/dt$ which is the time rate of change of the thunderstorm potential. The electric field, E, is defined as $E= V/h$ where $h$ is the altitude of the charge center of the thunderstorm. By combining the equations, $e(t)=R_1 C_c h\ dE/dt$ is obtained showing the antenna voltage to be proportional to the first time derivative of the electric field. In order that the resistor 10 and capacitance $C_c$ function as a differentiator, the same constant must be small compared to changes in the electric field.

A low pass filter connected with resistor 10 is represented by the block 13. The low pass filter circuitry 13 serves to keep other antenna signals from the remainder of the circuit 2 so that proper response to the electrostatic field will be obtained. This is particularly desirable in view of the inverse cube range dependency mentioned earlier. The output of the low pass filter circuitry 13 is applied to a differentiating circuit 14 which includes means for coupling the differentiated signal to a standard count rate circuit 15. As has been explained, the input signal to the differentiating circuit 14 is the first time derivative of the electrostatic field sensed by the antenna 1, so the output of the differentiating circuit 14 is the second time derivative of the electrostatic field. The second time derivative of the electrostatic field determines the minima and maxima of the varying electrostatic field and appear as pulses at the output of the differentiating circuit 14.

The pulses from the differentiating circuit 14 are applied to the count rate circuit 15 to develop a voltage which is applied to a threshold switch 16. When the pulse rate from the differentiating circuit 14 is sufficient to develop a voltage to operate the threshold switch 16, the switch 16 supplies a signal to the AND circuit 3 indicative of the presence of a severe thunderstorm in the local area.

In the embodiment shown in FIG. 1, the circuit 4 uses the electromagnetic signals sensed by the antenna to provide a signal to AND circuit 3 that is indicative of the presence of a thunderstorm in a local area. Since the alerting device is to be effective for a local area only a portion of the electromagnetic signals produced by a thunderstorm are processed by circuit 4. Signal or pulse resolution and propagation range desired for a local alerting device indicated detection of the storm generated signals is best accomplished at a frequency above 400kHz.

The circuit 4 includes a two-stage filter-amplifier 17 which is connected between the antenna 1 and a demodulator circuit 18. The filters for circuit 17 are narrow band width filters having a center frequency above 400kHz. The two stages of amplification provide pulses to the demodulator circuit 18 of sufficient voltage to be envelope detected. The detected pulses are applied to a standard count rate circuit 19 to provide a voltage which is applied to the threshold switch 20. When the pulse rate is sufficient to develop voltage to affect the threshold switch 20, the switch 20 supplies a signal to AND circuit 3 indicative of the presence of a thunderstorm in the local area.

Figure 3:
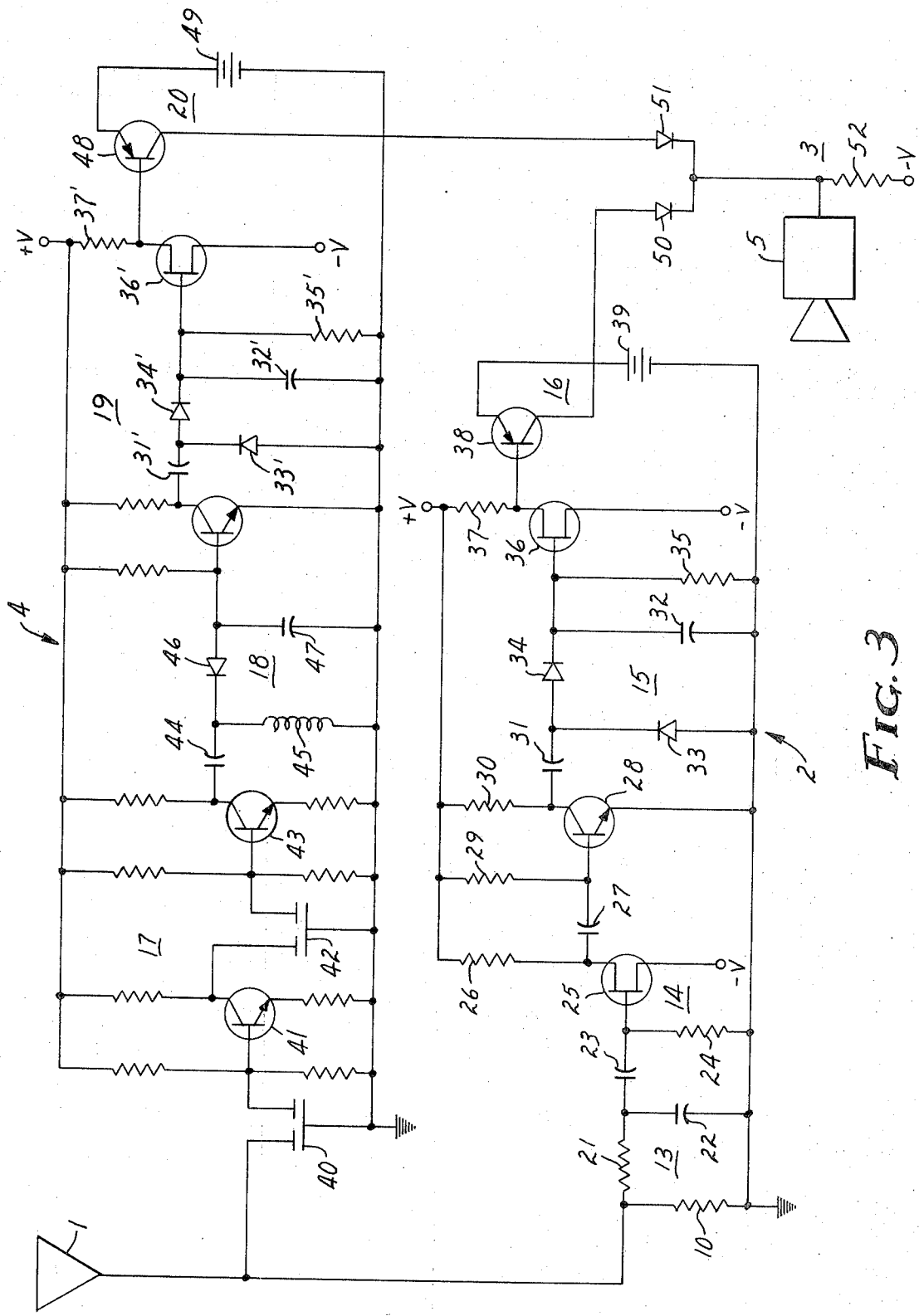
FIG. 3 is a schematic circuit of the circuitry set forth in FIG. 1.

FIG. 3 shows the circuit details for the various circuit portions which will be described. Specifications and component values are set forth which will enable one skilled in the art to construct a severe thunderstorm detector embodying the invention which is capable of automatically monitoring a local area within about a 10 mile radius of the antenna.

The antenna 1 may be a single wire antenna 100 feet long and positioned about 25 feet above ground. This will provide an omnidirectional antenna. As previously mentioned, the time constant provided by resistor 10 and the capacitance $C_c$ coupling the antenna 1 to the charge center in a thunderstorm will be small. For the antenna mentioned above, a 22 megohm resistor may be used for resistor 10.

The low pass filter 13 is represented by the resistor 21 connected to resistor 10 and capacitor 22 connected between resistor 21 and ground. A low pass filter 13 having its 3 db point at 0.03Hz may be used.

The differentiating circuit 14 is represented by the capacitor 23 connected to resistor 21 and capacitor 22 plus resistor 24 which is connected between capacitor 23 and ground. As can be seen, the circuit is shown in the form of a high pass filter. The circuit 14 may be a high pass filter having its 3 db point at 0.03Hz.

The circuit 14 also includes the circuitry needed to couple the differentiated signal to the count rate circuit 15. The coupling includes a field effect transistor 25 connected as a source follower. The gate electrode is connected to capacitor 23 and resistor 24 while the source electrode is connected to a positive voltage source +V via a resistor 26. The drain electrode connects with a negative voltage −V. The source electrode is coupled to the count rate circuit 15 via the capacitor 27.

The count rate circuit 15 includes an NPN type transistor 28 which has its base and collector electrode connected to the voltage source +V via resistors 29 and 30, respectively. The emitter electorde is connected to ground. The transistor 28 is normally conducting with the level of conduction being reduced when a negative pulse is received from the differentiating circuit 14.

The basic circuit portion of the rate counter 15 is the standard diode rate counting circuit which includes capacitors 31 and 32, diodes 33 and 34 and resistor 35. The voltage developed across capacitor 32 is a measure of the rate of pulses received from the differentiating circuit 14. Thus, each time the conduction of transistor 28 is reduced, by a pulse from circuit 14 the voltage at collector of transistor 28 rises to apply a positive current pulse to capacitor 32. As more and more pulses are received, the voltage on capacitor 32 rises. The resistor 35 connected across capacitor 32 causes the capacitor 32 to be discharged to some degree when a pulse is not being received from circuit 14. Any count rate circuit 15 may be used that will develop a voltage across capacitor 32 sufficient to operate the threshold circuit 16 when pulses are supplied to circuit 15 at a rate of 15 pulses per minute. A 2 microfarad capacitor and 100 megohm resistor can be used for capacitor 32 and resistor 35.

A field effect transistor 36 connected as a source follower is used to couple the voltage present across the capacitor 32 to the threshold circuit 16. The gate electrode is connected to capacitor 32 and resistor 35 while the source electrode is connected to a positive voltage +V via a resistor 37. The drain electrode connects with a negative voltage source −V. The source electrode is also connected directly to the threshold circuit 16.

The threshold circuit 16 may be a normally conducting PNP type transistor 38 which has its emitter electrode connected to a reference voltage, which in FIG. 3 is indicated by the battery 39. The collector electrode is connected to one input of the AND circuit 3. When the voltage across capacitor 32 of the count rate circuit 15 exceeds the reference voltage 39, the transistor 38 is turned off. Thus, no current flow to the AND circuit 3 from the threshold circuit 16 is indicative of the presence of a severe thunderstorm in a local area.

The two-stage filter amplifier 17 of circuit 4 may use narrow band pass ceramic type filters having a center frequency of 455 kHz, an effective Q of 160 and a bandwidth of 2,845 Hz. The gain for the two stages can be 62. The filter 40 for the first stage is connected between the antenna 1 and the base of an NPN type transistor 41 which is connected as an amplifier. The second stage is identical to the first stage and has its filter 42 connected between the collector of transistor 41 and amplifying transistor 43. The output of transistor 43 is applied to the demodulator circuit 18 via a capacitor 44 and an inductor 45.

The voltage of the signal provided at the output of the filter-amplifier 17 is sufficient that it is possible to use a simple diode envelope-demodulator which includes the diode 46 and capacitor 47. The output from the demodulator 18 is in the form of negative pulses which are applied to the count rate circuit 19.

The count rate circuit 19 is similar to the count rate circuit 15 except for actual component values. The components in count rate circuit 19 corresponding to the same component in rate circuit 15 are identified using the same reference numerals used for circuit 15 with a prime notation applied to each reference. A count rate circuit 19 may be used that will develop a voltage across capacitor 32′ sufficient to operate threshold circuit 20 when pulses are supplied to circuit 19 at a rate of 2,800 pulses per minute. A 10 microfarad capacitor and a 50 megohm resistor can be used for capacitor 32′ and resistor 35′.

The threshold circuit 20 which connects with the source of field effect transistor 36′ may be of the same type used for the threshold circuit 16. The circuit 20 includes a normally conducting PNP type transistor 48 which has its emitter electrode connected to the reference voltage represented by the battery 49. The collector electrode is connected to a second input of the AND circuit 3. When the voltage across capacitor 32′ exceeds the reference voltage 49, the transistor 48 is turned off. No current flow to the AND circuit 3 from the threshold circuit 20 is indicative of the presence of a thunderstorm in a local area.

The AND circuit 3 shown includes diodes 50 and 51 with their anodes connected to the collectors of transistors 38 and 48, respectively. The cathodes of diodes 50 and 51 are connected together and via a resistor 52 connect with a negative voltage −V. The output for the AND circuit 3 is obtained at the connection common to resistor 52 and the cathodes of diode 50 and 51. The output of AND circuit 3 is applied to an alarm circuit 5 which may include means for producing an audible signal. Alarm circuits are well known and any number can be designed for actuation in response to the AND circuit output presented when both of the transistors 38 and 48 are not conducting, i.e., when a severe thunderstorm is present in the local area.

While the circuit 4 used to obtain a signal for application to the AND circuit 3 indicative of the presence of a thunderstorm used the electromagnetic field produced by the sferics generated by a thunderstorm, it should be understood that the electrostatic field of atmospheric electrical discharges could also be utilized to obtain such a signal and such circuitry is known to those skilled in the art. Similarly, the inductive field could be sensed for this purpose. Such an approach would, however, require a separate loop type antenna.

In the light of the above techings, alternate arrangemenets and techniques embodying the invention will be suggested to those skilled in the art. The scope of protection afforded the invention is not intended to be limited to the specific embodiment disclosed, but is to be determined only in accordance with the appended claims.

What is claimed is:

1. A severe thunderstorm detection circuit comprising:
    means for providing a first signal indicative of the presence in a local area of one of several possible weather conditions including a severe thunderstorm;
    means for providing a second signal indicative of the presence of a thunderstorm in said local area; and
    means connected to receive said first and second signals for providing an alarm signal when said first and second signals concur.

2. A severe thunderstorm detection circuit in accordance with claim 1 wherein said first mentioned means includes means responsive to the electrostatic field at a location within said local area.

3. A severe thunderstorm detection circuit in accordance with claim 2 wherein said means responsive to the electrostatic field includes means for determining the rate of occurrence of maxima and minima variation of said electrostatic field, said first signal being provided when said rate exceeds a predetermined rate.

4. A thunderstorm weather detection circuit in accordance with claim 3 wherein said means responsive to the electrostatic field includes a circuit for obtaining the second time derivative of said electrostatic field as a measure of said maxima and minima variation of the electrostatic field.

5. A severe thunderstorm detection circuit in accordance with claim 1 wherein said second mentioned means includes means responsive to the electromagnetic field signals at a location within said local area for providing said second signal.

6. A severe thunderstorm detection circuit in accordance with claim 5 wherein said means responsive to the electromagnetic field signals includes
    means for providing pulses by envelope demodulating said electromagnetic field signals present at said location which are within a narrow band of frequencies above 400 kHz; and means for determining the rate of occurrence of said pulses, said second signal being provided when said pulse rate exceeds a predetermined rate.

7. A severe thunderstorm detection circuit comprising:

means responsive to the electrostatic field at a location for providing a first signal indicative of the presence in a local area of one of several possible weather conditions including a severe thunderstorm;

means responsive to the electromagnetic field signals at said location for providing a second signal indicative of the presence of a thunderstorm within said local area; and means connected to receive said first and second signals for providing an alarm signal when said first and second signals are present at the same time.

8. A severe thunderstorm detection circuit in accordance with claim 7 wherein said means responsive to the electrostatic field includes means for determining the rate of occurrence of maxima and minima variation of said electrostatic field, said first signal being provided when said rate exceeds a predetermined rate.

9. A thunderstorm weather detection circuit in accordance with claim 8 wherein said means responsive to the electrostatic field includes a circuit for obtaining the second time derivative of said electrostatic field as a measure of said maxima and minima variation of the electrostatic field.

10. A severe thunderstorm detection circuit in accordance with claim 7 wherein said means responsive to the electrostatic field includes means for determining the rate of occurrence of maxima and minima variation of said electrostatic field, said first signal being provided when said rate exceeds a predetermined rate; and wherein said means responsive to the elecromagnetic field includes means for providing pulses by envelope demodulating said electromagnetic field signals present at said location which are within a narrow band of frequencies above 400kHz; and means for determining the rate of occurrence of said pulses, said second signal being provided when said pulse rate exceeds a predetermined rate.

11. A severe thunderstorm detection circuit in accordance with claim 10 wherein said means for determining the rate of occurrence of maxima and minima variation of said electrostatic field includes a circuit for obtaining the second time derivative of said electrostatic field as a measure of said maxima and minima variation of the electrostatic field.

12. A severe thunderstorm detection circuit in accordance with claim 7 wherein said means responsive to the electrostatic field includes an antenna and said means responsive to said electromagnetic field includes said antenna.

13. A severe thunderstorm detection circuit in accordance with claim 12 wherein said antenna is an omnidirectional antenna.

14. A method for detecting the presence of a severe thunderstorm in a local area comprising the steps of determining the rate of occurrence of maxima and minima variation in the electrostatic field present at a location within the local area, said rate in excess of a predetermined rate indicating the presence of one of several possible weather conditions including a severe thunderstorm;

determining whether the weather condition is a thunderstorm in the event said rate is in excess of a predetermined rate;

activating an alarm in the event a thunderstorm is determined to exist at the time said rate is in excess of a predetermined rate.

15. A method for detecting the presence of a severe thunderstorm in a local area in accordance with claim 14 wherein the step determining the rate of occurrence of maxima and minima variation in the electrostatic field sensed includes the steps of positioning an antenna which is connected via a resistor to ground at a location within the local area; applying the voltage developed across said resistor in response to the electrostatic field at said location to a differentiating circuit to obtain indications of the occurrence of maxima and minima variation of the electrostatic field at said location; and applying said indications to a count rate circuit to obtain the rate of occurrence of said maxima and minima variation of the electrostatic field.

16. A method for detecting the presence of a severe thunderstorm in a local area in accordance with claim 14 wherein the step determining whether the weather condition is a thunderstorm includes the steps of sensing the electromagnetic field signals at said location;

selecting from said signals those signals which are within a narrow band width above 400 kHz;

applying said selected signals to an envelope demodulator to provide pulses indicative of said selected signals;

applying said pulses to a count rate circuit to obtain the rate of occurrence of said pulses which rate when exceeding a predetermined rate is indicative of the presence of a thunderstorm.

* * * * *

UNITED STATES PATENT OFFICE
CERTIFICATE OF CORRECTION

Patent No. 3,790,884   Dated February 5, 1974

Inventor(s) Douglas A. Kohl

It is certified that error appears in the above-identified patent and that said Letters Patent are hereby corrected as shown below:

Column 3, line 25, "same" should be --time--.  Column 4, line 48, "electorde" should be --electrode--.  Column 6, line 23, "menets" should be --ments--.

Signed and sealed this 10th day of September 1974.

(SEAL)
Attest:

McCOY M. GIBSON, JR.          C. MARSHALL DANN
Attesting Officer              Commissioner of Patents